United States Patent [19]
Hamburg et al.

[11] Patent Number: 5,483,946
[45] Date of Patent: Jan. 16, 1996

[54] ENGINE CONTROL SYSTEM WITH RAPID CATALYST WARM-UP

[75] Inventors: Douglas R. Hamburg, Bloomfield; Philip W. Husak, Southgate; Daniel L. Meyer, Dearborn; Steven R. Whittier, Saline, all of Mich.

[73] Assignee: Ford Motor Company, Dearborn, Mich.

[21] Appl. No.: 333,696

[22] Filed: Nov. 3, 1994

[51] Int. Cl.$^6$ .................................................. F02D 41/00
[52] U.S. Cl. .................. 123/686; 123/674; 123/680; 123/688; 123/696; 123/419; 123/339.24; 60/284
[58] Field of Search .................................. 123/674, 675, 123/680, 681, 682, 685, 688, 695, 696, 419, 422, 423, 339.24, 686; 60/284, 285

[56] References Cited

U.S. PATENT DOCUMENTS

| | | | |
|---|---|---|---|
| 4,144,853 | 3/1979 | Maruoka et al. | 60/285 |
| 4,777,924 | 10/1988 | Fujimura et al. | 123/685 |
| 4,936,276 | 6/1990 | Gopp | 123/425 |
| 5,203,300 | 4/1993 | Orzel | 123/520 |
| 5,211,011 | 5/1993 | Nishikawa et al. | 60/284 |
| 5,228,421 | 7/1993 | Orzel | 123/518 |
| 5,253,631 | 10/1993 | Curran | 123/696 |

*Primary Examiner*—Noah P. Kamen
*Attorney, Agent, or Firm*—Allan J. Lippa; Roger L. May

[57] ABSTRACT

Air/fuel and ignition control of engine (28) are used to more rapidly heat-up a catalytic converter (52). A control system (8) generates a fuel command (100) for fuel delivery to the engine (28) based upon at least an amount of air inducted into the engine. The fuel command is offset by a predetermined amount in a lean direction during a period after engine start to shift the engine exhaust gas mixture towards a preselected air/fuel ratio lean of stoichiometry (106–122). In addition, the fuel command is corrected by a correction value so that the exhaust gas mixture is shifted ore closely to the preselected air/fuel ratio (126–140). Correction values are adaptively learned (300–324) during a portion of the warm-up period from a feedback signal derived from an exhaust gas oxygen sensor (44). Ignition timing and engine idle are also controlled (350–374) to further achieve more rapid warm-up of the catalytic converter (52).

21 Claims, 7 Drawing Sheets

ENGINE CONTROL SYSTEM WITH RAPID CATALYST WARM-UP

BACKGROUND OF THE INVENTION

The field of the invention relates to engine control systems, including air/fuel and ignition control systems, which provide rapid warm-up of the catalytic converter.

U.S. Pat. No. 5,211,011 describes a system in which fuel delivered to the engine is alternately run rich and then lean while the converter is below a desired temperature, and before closed loop fuel control is commenced. More specifically, an open loop fuel command is forced rich or lean of a desired open loop value. Ignition timing is also retarded until the converter reaches the desired temperature. Thereafter, fuel is adjusted in response to a feedback variable derived from an exhaust gas oxygen sensor.

The inventors herein have recognized numerous problems with the above approaches. For example, a lean open loop fuel command which is intended to result in air/fuel operation slightly lean of stoichiometry may result in air/fuel operation leaner than desired causing rough engine operation and increased emissions. Such leaner than desired operation may occur as the engine and its components age (e.g., slightly clogged fuel injectors). Another problem is that lean operation may reduce engine power which is annoying to the vehicular operator when power is demanded. The deliberate rich perturbation in air/fuel operation of the prior approach may also result in an increase in emissions.

SUMMARY OF THE INVENTION

An object of the invention claimed herein is to rapidly warm the converter by air/fuel control and/or ignition control while maintaining smooth engine operation, minimizing emissions, and providing engine power when demanded.

The problems of prior approaches are overcome, and the objects and advantages of the claimed invention achieved, by providing a control method and system for an internal combustion engine having its exhaust coupled to a catalytic converter. In one aspect of the invention, the method comprises the steps of: retarding ignition timing from a nominal value during a period following engine start and returning the ignition timing to the nominal value by termination of the period; offsetting a mixture of air and fuel inducted into the engine by a predetermined amount in a lean direction during the period to shift engine exhaust gas mixture towards an air/fuel ratio lean of stoichiometry by a preselected amount; and correcting said predetermined air/fuel mixture offset by a correction value so that said exhaust gas mixture is shifted more closely to said lean offset from stoichiometry. Preferably, the ignition timing is returned to the nominal value during the period in response to a demand for engine power from a vehicle operator.

An advantage of the above aspect of the invention is that a lean shift in engine air/fuel ratio is obtained thereby providing rapid converter warm-up without incurring rough engine operation. Another advantage is that engine power is not reduced when power is demanded by the operator. Still another advantage is that rapid converter warm-up is achieved by a control system which further reduces emissions during the warm-up period.

In another aspect of the invention the control system comprises: an exhaust gas oxygen sensor coupled to the engine exhaust; a controller generating a fuel command for delivering fuel to the engine based upon at least an amount of air inducted into the engine, the controller offsetting the fuel command by a predetermined amount in a lean direction during a period after engine start to shift engine exhaust gas mixture towards a preselected air/fuel ratio lean of stoichiometry by a preselected amount, the period comprising a first portion and a later occurring second portion, the controller adaptively learning the correction value during the second portion of the period from a feedback signal derived from the exhaust gas oxygen sensor and correcting the offset fuel command by the correction value so that the exhaust gas mixture is shifted more closely to the preselected air/fuel ratio; and feedback means for adjusting the fuel command in response to the feedback signal to maintain the exhaust gas mixture at the preselected air/fuel ratio during the second portion of the period and to maintain the exhaust gas mixture at stoichiometry after termination of the period.

An advantage of the above aspect of the invention is that the engine air/fuel ratio is accurately shifted to a desired lean value by adaptive learning which eliminates any shift errors thereby providing rapid converter warm-up without incurring rough engine operation. Another advantage is that rapid converter warm-up is achieved by a control system which further reduces emissions during the warm-up period.

BRIEF DESCRIPTION OF THE DRAWINGS

The object and advantages of the claimed invention will become more readily apparent from the following detailed description of an example of operation described with reference to the drawings wherein:

DESCRIPTION OF AN EXAMPLE OF OPERATION

Figure 1:
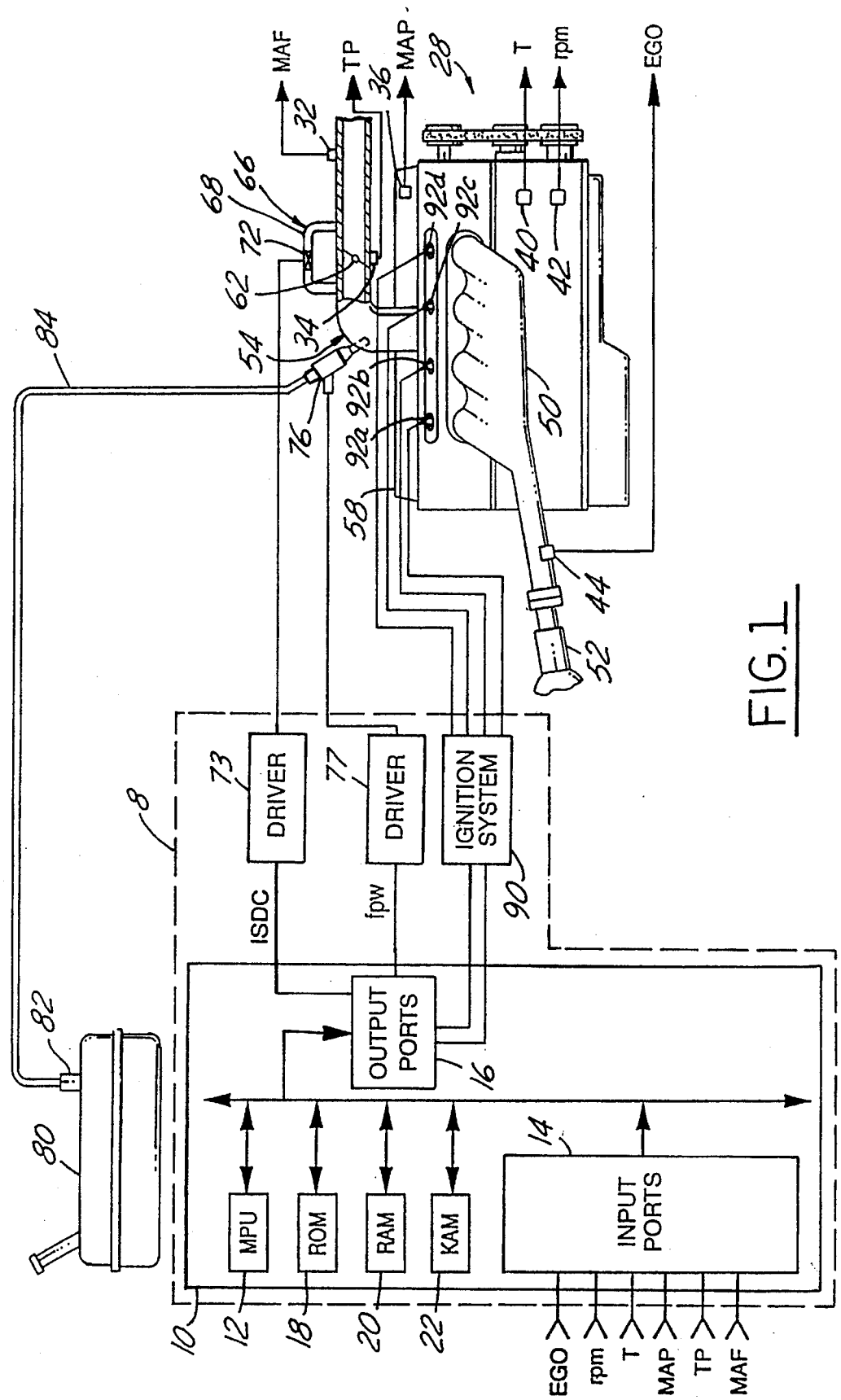
FIG. 1 is a block diagram of an embodiment in which the invention is used to advantage.

Controller 8 is shown in the block diagram of FIG. 1 including conventional microcomputer 10 having: microprocessor unit 12; input ports 14; output ports 16; read only memory 18, for storing control programs; random access memory 20, for temporary data storage which may also be used for counters or timers; keep-alive memory 22, for storing learned values; and a conventional data bus. As described in greater detail later herein, controller 8 controls operation of engine 28 by the following control signals; pulse width signal fpw for controlling liquid fuel delivery via drivers 77; idle speed duty cycle signal ISDC for controlling engine idle speed via drivers 73; and conventional distributorless ignition system 90 for providing ignition current to spark plugs 92a–d.

Controller 8 is shown receiving various signals from conventional engine sensors coupled to engine 28 including: measurement of inducted mass airflow (MAF) from mass airflow sensor 32; indication of primary throttle position (TP) from throttle position sensor 34; manifold absolute pressure (MAP), commonly used as an indication of engine load, from pressure sensor 36; engine coolant temperature (T) from temperature sensor 40; indication of engine speed (rpm) from tachometer 42; and output signal EGO from exhaust gas oxygen sensor 44 which, in this particular example, provides an indication of whether exhaust gases are either rich or lean of stoichiometric combustion.

In this particular example, engine 28 is shown having EGO sensor 44 coupled to exhaust manifold 50 upstream of conventional catalytic converter 52. Intake manifold 58 of engine 28 is shown coupled to throttle body 54 having primary throttle plate 62 positioned therein. Bypass throttling device 66 is shown coupled to throttle body 54 and includes; bypass conduit 68 connected for bypassing primary throttle plate 62; and solenoid valve 72 for throttling conduit 68 in proportion to the duty cycle of idle speed duty cycle signal. ISDC from controller 8. Throttle body 54 is also shown having fuel injector 76 coupled thereto for delivering liquid fuel in proportion to the pulse width of signal fpw from controller 8. Fuel is delivered to fuel injector 76 by a conventional fuel system including fuel tank 80, fuel pump 82, and fuel rail 84.

Figure 2A:
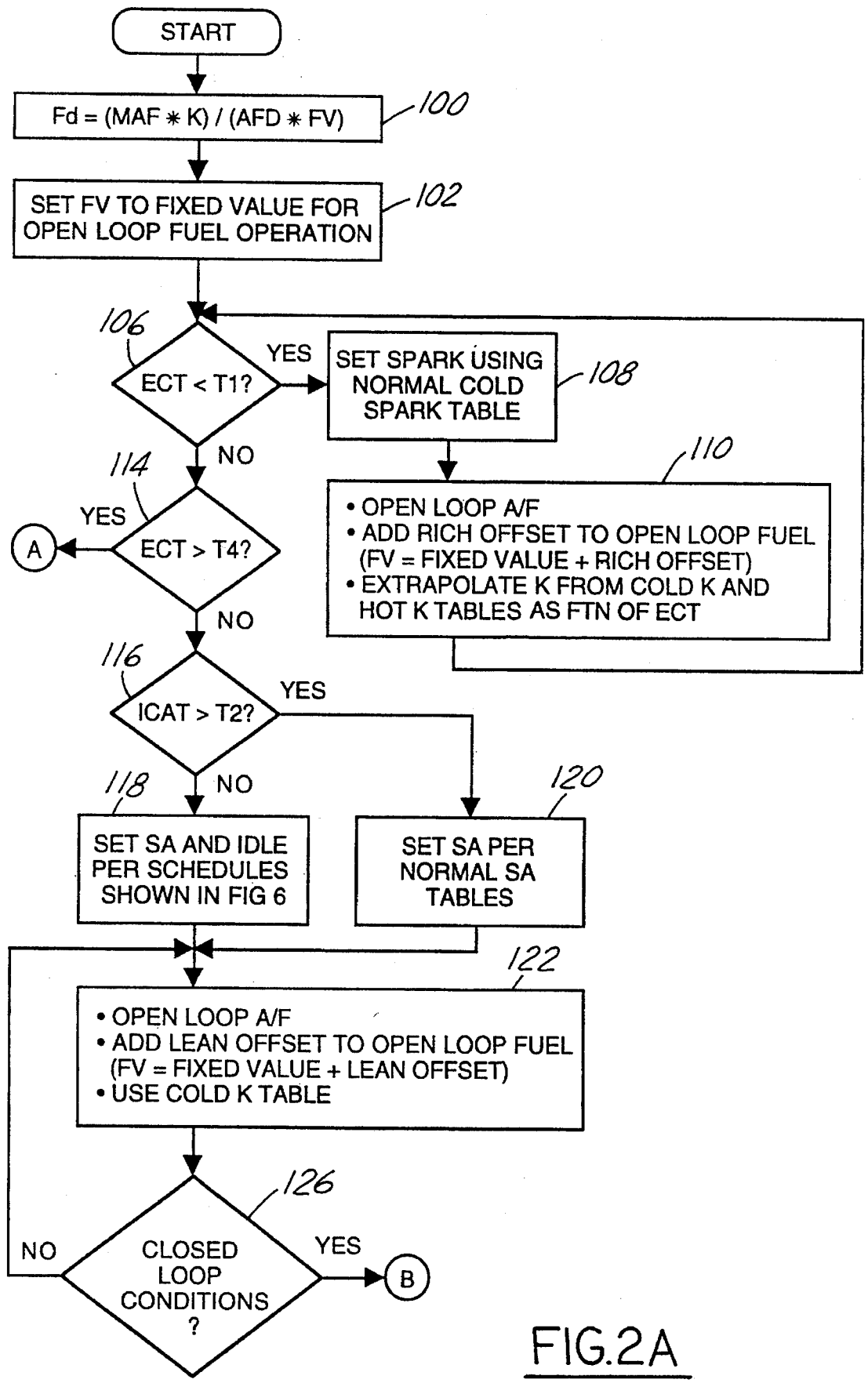
FIGS. 2A–2B, and 3–5 are flow charts of various operations performed by portions of the embodiment shown in FIG. 1.
Figure 2B:
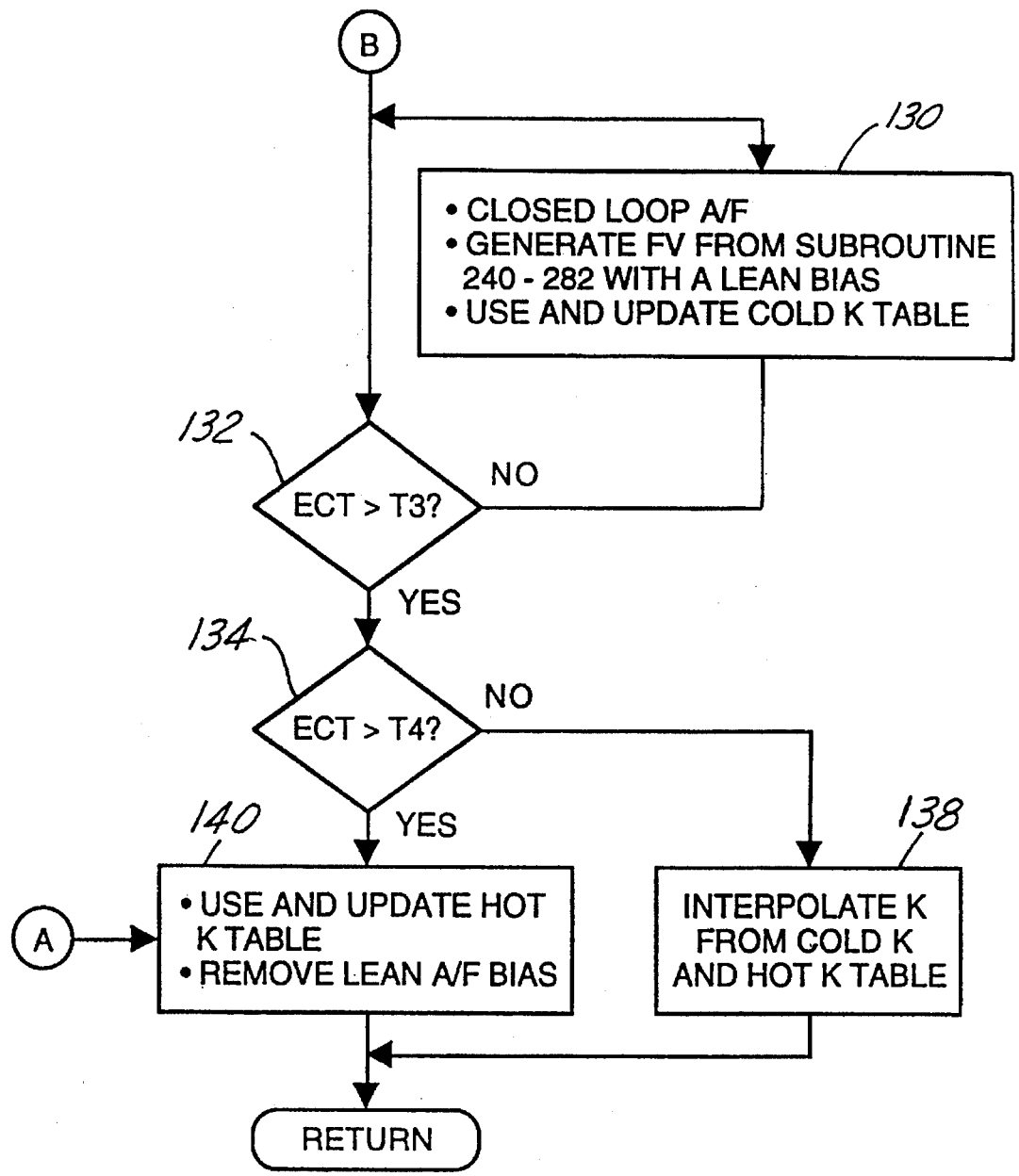

A description of various air/fuel operations performed by controller 8 is now commenced with initial reference to the flow charts shown in FIGS. 2A–2B. During step 100, the fuel command (shown as desired fuel quantity Fd) is calculated by dividing the product of desired air/fuel ratio AFD times feedback variable FV into the product of inducted mass flow measurement MAF times correction value K. In this particular example, desired air/fuel ratio AFD is the stoichiometric value of the fuel blend used which is 14.3 pounds of air per pound of fuel for a low emissions fuel blend. Feedback variable FV and correction value K are each generated by the feedback routines, responsive to EGO sensor 44, which are described latter herein with particular reference to respective FIGS. 3 and 4.

Continuing with FIGS. 2A–2B, feedback variable FV is initially set to a fixed value for open loop air/fuel operation (step 102). Stated another way, desired fuel quantity Fd provides an open loop fuel command which is related to signal MAF and is not adjusted by feedback. In this particular example, feedback variable FV is set to unity which would correspond to operation at desired air/fuel ratio AFD under ideal operating conditions without any engine component aging. It is well known, however, that this open loop operation may not result in engine air/fuel exactly at stoichiometry. Correction by correction value K, however, will be provided as described below.

When engine coolant temperature ECT is less than predetermined temperature T1 (step 106), engine temperature is too low to enter the subroutine for converter warm-up. The subroutine described with reference to steps 108–110 is then entered to minimize the time required to start and reliably warm-up engine 28. In step 108, ignition timing is first set using the cold start table stored in microcomputer 10. Various sub steps are then performed during step 110. Open loop air/fuel operation proceeds by adding a rich offset to desired fuel quantity Fd. In this particular example, feedback variable FV is set to a fixed value less than unity. Correction value K is then extrapolated from two tables stored in microcomputer 10 which store correction K for cold engine operation and hot engine operation, respectively. In this example, the extrapolation occurs as a function of engine coolant temperature ECT.

In the event engine coolant temperature ECT is greater than temperature T1 (step 106), it is compared to temperature T4 (step 114) which is associated with hot engine operation and normal air/fuel ratio control. If engine coolant temperature ECT is less than temperature T4, an inference of the temperature of catalytic converter 52 (ICAT) is compared to temperature T2 (step 116). When inferred temperature ICAT is less than temperature T2, ignition timing and engine idle speed are set per the schedules described later herein with particular reference to FIG. 6 (step 118). On the other hand, if inferred temperature ICAT is greater than temperature T2, then normal ignition timing tables are utilized (step 120). Ignition timing is commonly referred to as spark advance (SA) from cylinder top dead center position (TDC) in degrees of crankshaft angles (CA).

After ignition timing and engine idle speed are established as described above, a predetermined lean offset is imposed on desired fuel quantity Fd (step 122). Stated another way, open loop fuel control continues with a lean offset imposed on the open loop fuel quantity commanded so that the exhaust air/fuel ratio is lean of stoichiometry by a preselected amount. In this particular example, the lean offset is provided by setting feedback variable FV to a fixed value and increasing this fixed value by a predetermined amount correlated with the desired lean offset as a function of ECT (step 122). Further, correction value K is read from the table of microcomputer 10 storing cold correction values for a plurality of engine speed and load cells. As described later herein, each correction value K is subsequently generated from closed loop air/fuel feedback control. Also, each correction value K advantageously corrects any error between the open loop lean offset provided by the open loop fuel command and the desired lean shift in air/fuel ratio from stoichiometry.

An advantage of the above described correction is that precise lean air/fuel control and smooth engine operation is obtained which was not heretofore possible with prior art approaches. Because prior art approaches relied on simply an open loop lean shift in air/fuel ratio, the actual lean shift in air/fuel ratio may have been too lean resulting in rough engine operation. This problem is solved as described in more detail below by application of correction value K to the open loop fuel command.

The above described open loop air/fuel operation continues until closed loop conditions are detected in step 126. In this particular example, closed loop air/fuel control is commenced when engine coolant temperature ECT is above a predetermined value, and a readiness check such as temperature of EGO sensor 44 is satisfied. When closed loop air/fuel control is commenced (step 132), feedback variable FV is no longer set to a fixed value plus a lean offset, but is generated in response to EGO sensor 44 as described later herein with particular reference to steps 240–282 of the subroutine shown in FIG. 3. As further described in steps 240–282, feedback variable FV is generated with a lean bias so that engine air/fuel operation will average to a value offset from stoichiometry in the lean direction by a preselected amount. To more closely align the average air/fuel ratio with the preselected lean air/fuel ratio, desired fuel quantity Fd is further corrected by a correction value K for each engine speed load operating range (step 132) provided ECT is not greater than T3 (step 130). And, as described later herein with particular reference to FIG. 4, each correction value K is adaptively learned in response to various signal process steps performed on the output of EGO sensor 44.

The closed loop operation described above with reference to step 132 continues until engine coolant temperature ECT is greater than predetermined temperature T3 (step 130). If engine coolant temperature ECT is greater than temperature T3, but less than temperature T4 (step 134), each correction value K is interpolated from the cold K and hot K tables stored in microcomputer 10 for each engine speed load range (step 138). Other than selection of correction value K, closed loop operation continues as previously described above with particular reference to step 132.

In the event engine coolant temperature ECT is greater than temperature T4 (step 134), each correction value K is selected from the hot K tables of microcomputer 10 (step 140). In addition, a lean air/fuel bias is removed from feedback FV (step 140). Normal air/fuel feedback control is thereby commenced in step 140.

Figure 4:
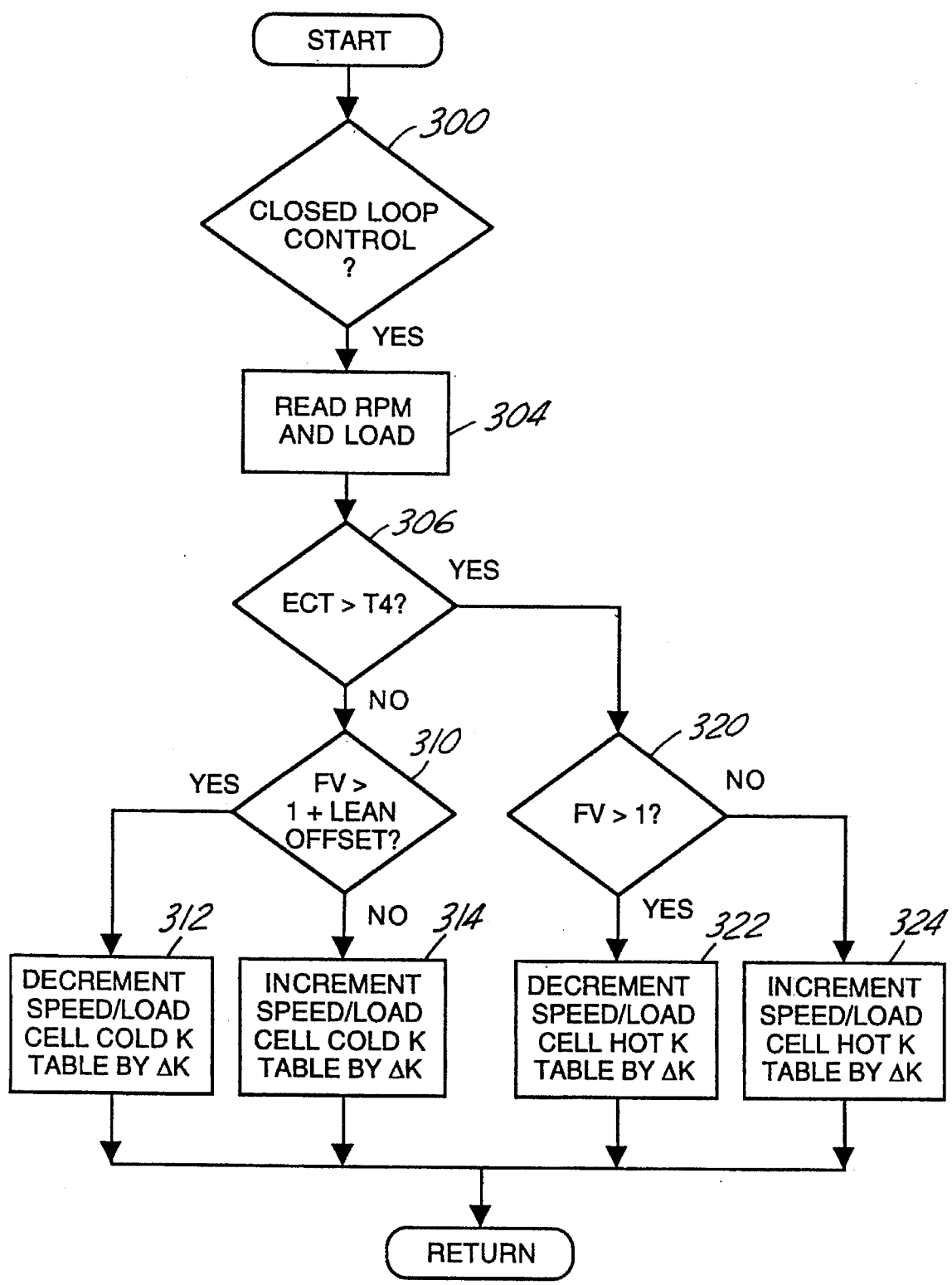

It is noted that correction value K for the hot K table is generated by adaptive learning as described later herein with particular reference to FIG. 4. By generating two sets of correction values (K) for cold and hot engine operation, and either extrapolating (step 110) or interpolating (step 138) between the tables, more accurate air/fuel operation is obtained. Once again, engine air/fuel operation is provided at either stoichiometry or preselected air/fuel ratios lean of stoichiometry by a preselected amount far more accurately than heretofore possible. Emissions are thereby minimized and overly lean operation which may result in engine stumble is avoided.

The air/fuel feedback subroutine executed by controller 8 to generate fuel feedback variable FV is now described with reference to the flowchart shown in FIG. 3. A determination is first made that closed loop (i.e., feedback) air/fuel control is desired in step 240 in the same manner as previously described herein with reference to step 126 in FIGS. 2A–2B. Next, the subroutine determines whether feedback variable FV should be biased in step 244. In the event bias is not required, integral term Δi is set equal to integral term Δj, and proportional term Pi is set equal to proportional term Pj (step 246). Thus, the integration and proportional steps of the PI controller described above are set equal so that the resulting feedback variable FV has no bias.

On the other hand, when a bias is required (step 244), the integral and proportional terms are selected to provide the desired bias (step, 248). For example, in the event a lean bias is required as provided in previously described step 130 in FIGS. 2A–2B, proportional term Pi is made greater than proportional term Pj and/or integral term Δi is made greater than integral term Δj by a percentage necessary to achieve the desired bias. Stated another way, when the integral and proportional terms in the lean (i) direction and rich (j) direction are made equal, feedback variable FV will average to unity. Thus, the engine air/fuel ratio achieves an average at desired air/fuel ratio AFD. On the other hand, when the integral and proportional terms in the lean (i) direction are made greater than in the rich (j) direction, feedback variable FV will average to a value greater than unity by an amount determined by these terms. Thus, a desired lean bias in the air/fuel ratio is achieved.

Figure 3:
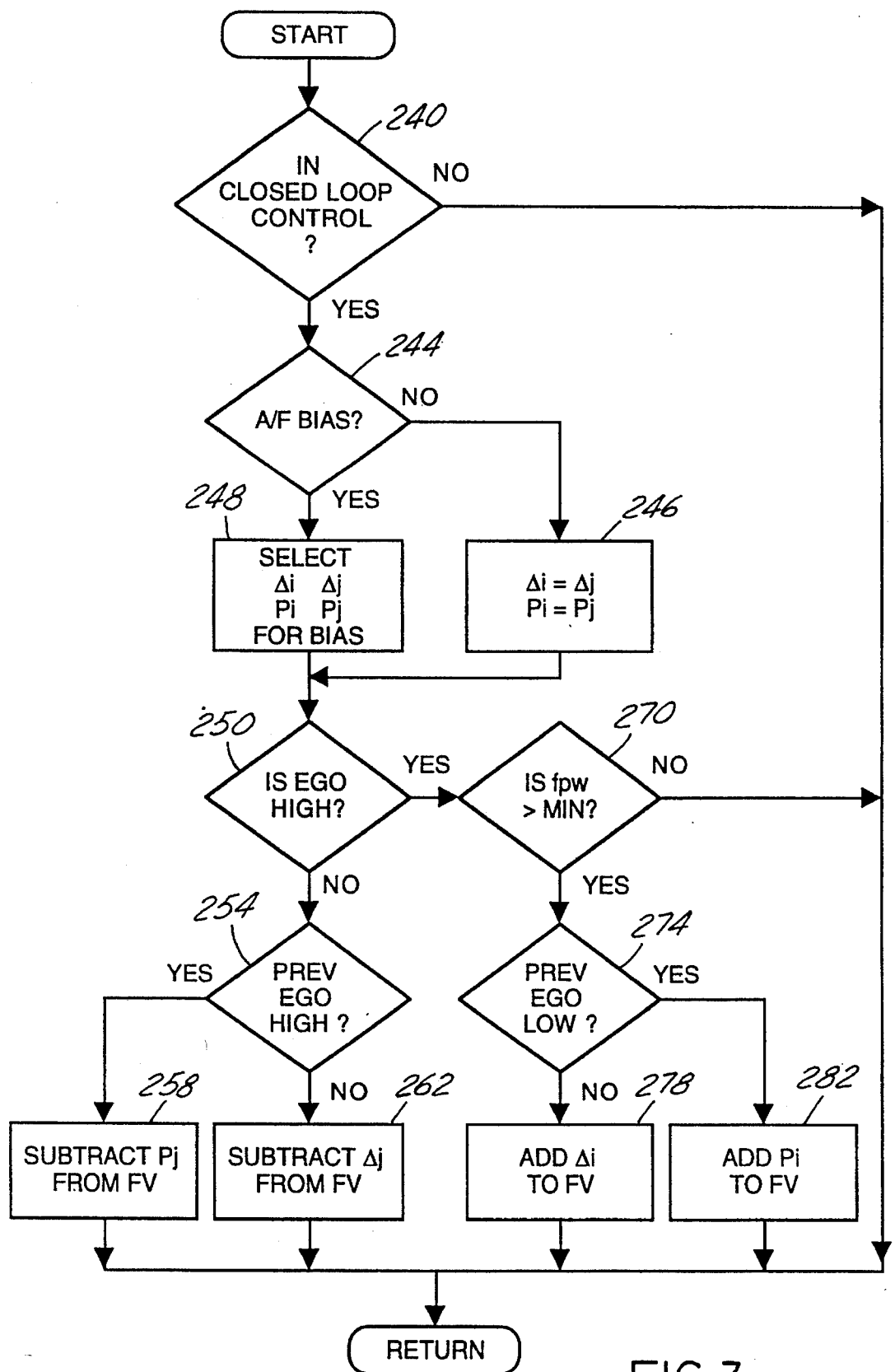

The specific manner in which the proportional and integral terms generate feedback variable FV is now described with respect to steps 250–282 of the subroutine shown in FIG. 3. EGO sensor 44 is sampled in step 250 during each background loop of controller 8. When EGO sensor 44 is low (i.e., lean), but was high (i.e., rich) during the previous background loop (step 254), proportional term Pj is subtracted from signal FV in step 258. When EGO sensor 44 is low, and was also low during the previous background loop, integral term Δj is subtracted from signal FV in step 262. Accordingly, in this particular example of operation, proportional term Pj represents a predetermined rich correction which is applied when EGO sensor 44 switches from rich to lean. Integral term Δj represents an integration step to provide continuously increasing rich fuel delivery when EGO sensor 44 continues to indicate combustion lean of stoichiometry.

When fpm is greater than a minimum value MIN (step 270) and when EGO sensor 44 is high but was low during the previous background loop (step 274), proportional term Pi is added to signal FV in step 282. When EGO sensor 44 is high, and was also high during the previous background loop, integral term Δi is added to signal FV in step 278. Proportional term Pi represents a proportional correction in a direction to decrease fuel delivery when EGO sensor 44 switches from lean to rich. Integral term Δi represents an integration step in a fuel decreasing direction while EGO sensor 44 continues to indicate combustion rich of stoichiometry.

The adaptive learning subroutine for learning correction value K during both cold engine and hot engine operation is now described with reference to the flowchart shown in FIG. 4. Operation for entering closed loop air/fuel control is first determined in step 300 in a similar manner to that previously described with reference to step 126 in FIGS. 2A–2B. Engine speed and load are then read during step 304 and the correction values generated below stored in tables for each speed load range.

When engine coolant temperature ECT is less than temperature T4 (step 306) and also less than F3 the cold K tables are updated as now described. If feedback variable FV is greater than its nominal value (unity in this example) plus the lean offset introduced as previously described with reference to FIGS. 2A–2B (step 310), then the cold K table speed/load cell is decremented by ΔK (step 312). On the other hand, if feedback variable FV is less than unity plus the lean offset (step 310), the corresponding speed/load cell in the cold K table incremented by ΔK (step 314).

Operation proceeds in a similar manner to adaptively learn correction value K during hot engine operation when engine coolant temperature ECT is greater than temperature T4 (step 306). More specifically, when feedback variable FV is greater than unity (step 320), the speed/load cell of the hot K table is decremented by ΔK (step 322). Similarly, when feedback variable FV is less than unity (step 320), the speed/load cell of the hot K table is incremented by ΔK (step 324).

The subroutine described above with respect to FIG. 4 provides an adaptive learning of the difference or error between actual engine air/fuel operation and the desired air/fuel ratio. It is also operable when the desired air/fuel ratio is offset from stoichiometry by a preselected offset.

The subroutine for setting ignition timing and engine idle to further enhance warm-up of catalytic converter 52 is now described with reference to a flowchart shown in FIG. 5 and related schedules shown in FIGS. 6A–6C. Base or nominal ignition timing is first determined (step 350) in conventional manner as a function of engine speed, load, and temperature. The subroutine then continues if operation is still within the warm-up period for catalytic converter 52 following engine start (step 352). This warm-up period is shown in schedules FIGS. 6A and 6B as a lapsed time from engine start. However, other indicia of catalytic converter 52 warm-up may be used to advantage. For example, temperature of catalytic converter 52 may be inferred from engine coolant temperature or direct measurement. The warm-up period may also be inferred from an integration of inducted airflow.

Figure 6A:
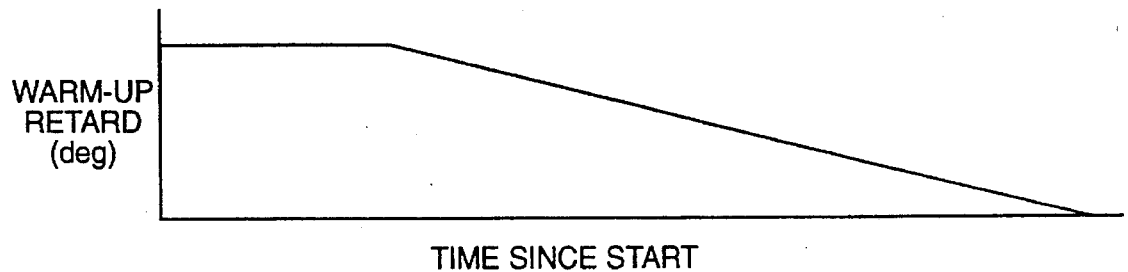
FIGS. 6A–6C graphically illustrate various operations performed by the embodiment shown in FIG. 1.
Figure 6B:
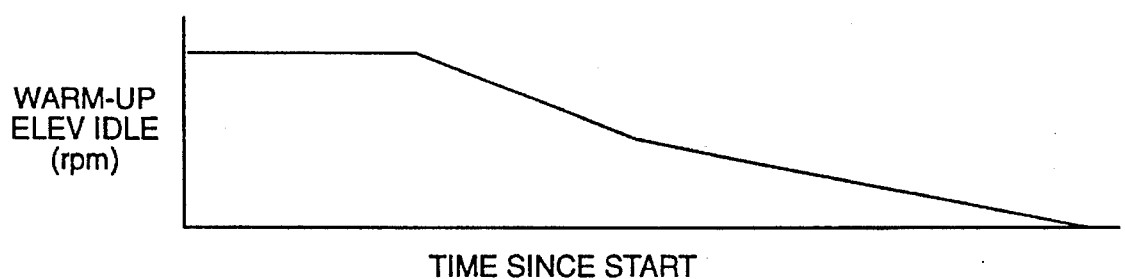

When engine 28 is operating within the above described warm-up period, engine idle speed is elevated (step 356) as shown in the schedule presented in FIG. 6B.

Figure 5:
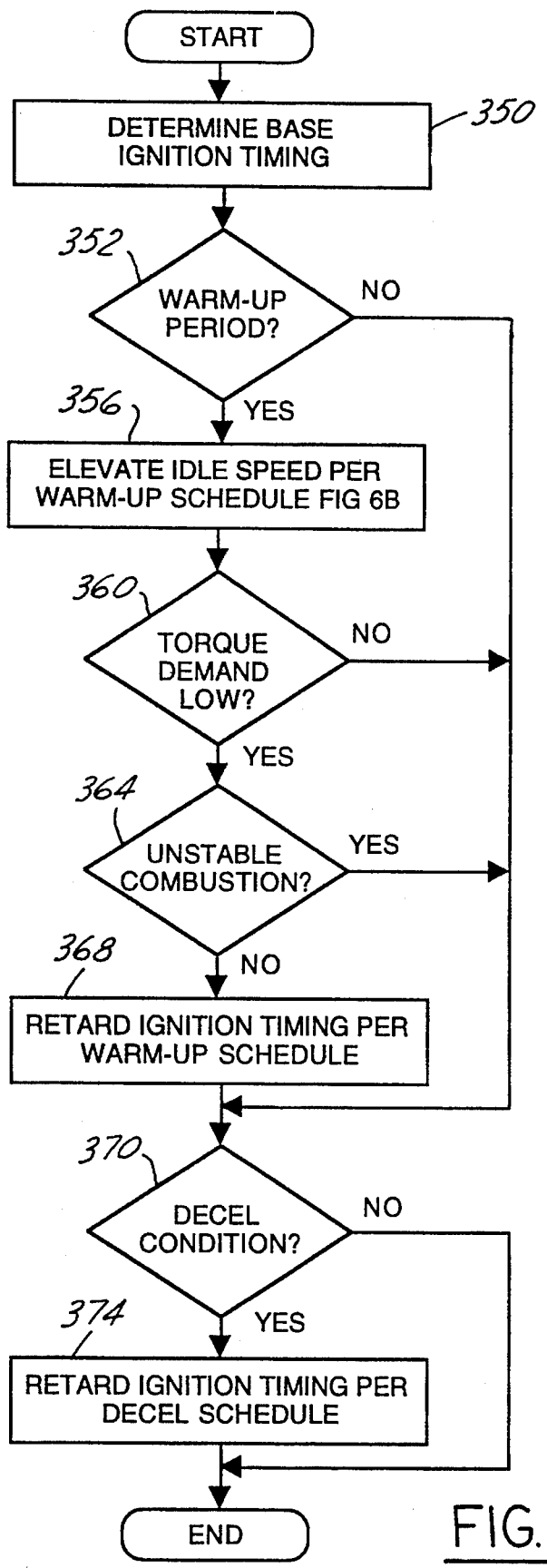

Continuing with the flowchart shown in FIG. 5, ignition timing is retarded from its nominal value (step 368) as shown in the ignition timing schedule in FIG. 6A provided that engine torque demand is low (step 360) and engine combustion is stable (step 364). If the vehicular operator demands engine torque such as when accelerating, then the retard schedule in FIG. 6A is bypassed by step 360 shown in FIG. 5. Similarly, if engine combustion appears unstable (step 364), the retard schedule of FIG. 6A is also bypassed.

Figure 6C:
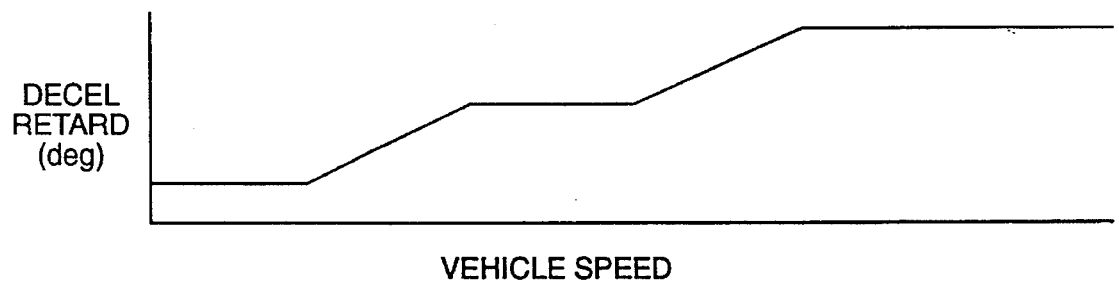

In the event of vehicle speed and/or engine rpm deceleration (step 370), the ignition retard schedule shown in FIG. 6C is implemented as provided in step 374. However, this retard schedule is bypassed if deceleration conditions do not exist (step 370).

The previously described operation of lean air/fuel operation reduces the warm-up period of catalytic converter 52 thereby reducing engine emissions. The ignition retard schedule and enhancement of engine idle schedule, described with reference to FIG. 5, also decreases the warm-up time for catalytic converter 52. These operations are performed more accurately than heretofore possible. For example, adaptive learning of correction factor K during hot and cold operation enables precise air/fuel control at any desired air/fuel ratio including a lean offset ratio. Further, the above described ignition retard schedules are accomplished in such a manner as to eliminate any undesired effect on engine power or stability.

Although one example of an embodiment which practices the invention has been described herein, there are numerous other examples which could also be described. For example, analog devices, or discreet IC's may be used to advantage rather than a microcomputer. Further, proportional rather than two-state exhaust gas oxygen sensors may be used to advantage. The invention is therefore to be defined only in accordance with the following claims.

What is claimed:

1. A control method for an internal combustion engine having its exhaust coupled to a catalytic converter, comprising the steps of:

retarding ignition timing from a nominal value during a period following engine start and returning said ignition timing to said nominal value by termination of said period;

offsetting a mixture of air and fuel inducted into the engine by a predetermined amount in a lean direction during said period to shift engine exhaust gas mixture towards an air/fuel ratio lean of stoichiometry by a preselected amount; and correcting said predetermined air/fuel mixture offset by a correction value so that said exhaust gas mixture is shifted more closely to said lean offset from stoichiometry.

2. The method recited in claim 1 further comprising a step of returning said ignition timing to said nominal value during said period in response to a demand for engine power from a vehicle operator.

3. The control method recited in claim 1 further comprising a step of retarding said ignition timing during said period in response to at least one of vehicle speed and engine rpm deceleration, said ignition timing retardation being a function of said at least one of vehicle speed and engine rpm during said deceleration.

4. The control method recited in claim 1 further comprising a step of increasing engine idle by a predetermined amount during said period.

5. The control method recited in claim 1 further comprising a step of detecting undesired engine operation and reducing said ignition retard in response to said detection.

6. The control method recited in claim 1 further comprising a step of adjusting said inducted air/fuel mixture during a portion of said period in response to a feedback variable derived by integrating an output of an exhaust gas oxygen sensor to maintain said exhaust gas mixture at said preselected offset from stoichiometry during said period.

7. The method recited in claim 6 further comprising a step of adaptively learning said correction value by comparing said feedback variable to a reference value.

8. The method recited in claim 7 wherein said period comprises a first portion and a subsequently occurring second portion and wherein said adaptive learning step occurs during said second portion of said period.

9. The method recited in claim 8 further comprising a step of commencing said second period portion in response to verification of said exhaust gas oxygen sensor readiness.

10. The method recited in claim 7 wherein said step of adaptively learning said correction value comprises steps of adaptively learning a plurality of correction values for a corresponding plurality of engine speed/load ranges and storing each of said correction values in a first correction table.

11. A control method for an internal combustion engine having its exhaust coupled to a catalytic converter, comprising the steps of:

generating a fuel command for delivering fuel to the engine based upon at least an amount of air inducted into the engine;

offsetting said fuel command by a predetermined amount in a lean direction during a period after engine start to shift engine exhaust gas mixture towards a preselected air/fuel ratio lean of stoichiometry by a preselected amount; correcting said offset fuel command by a correction value so that said exhaust gas mixture is shifted more closely to said preselected air/fuel ratio; and adaptively learning said correction value during a portion of said period from a feedback signal derived from an exhaust gas oxygen sensor.

12. The method recited in claim 11 further comprising a step of adjusting said fuel command during said portion of said period in response to said feedback signal to maintain said exhaust gas mixture at said preselected air/fuel ratio.

13. The method recited in claim 11 further comprising a step of retarding ignition timing from a nominal value during a period following engine start and returning said ignition timing to said nominal value by termination of said period.

14. A control method for an internal combustion engine having its exhaust coupled to a catalytic converter, comprising the steps of:

generating a fuel command for delivering fuel to the engine based upon at least an amount of air inducted into the engine;

offsetting said fuel command by a predetermined amount in a lean direction during a period after engine start to shift engine exhaust gas mixture towards a preselected air/fuel ratio lean of stoichiometry by a preselected amount, said period comprising a first portion and a later occurring second portion;

correcting said offset fuel command by a correction value so that said exhaust gas mixture is shifted more closely to said preselected air/fuel ratio;

adaptively learning said correction value during said second portion of said period from a feedback signal derived from an exhaust gas oxygen sensor;

removing said fuel command offset before termination of said period; and adjusting said fuel command in response to said feedback signal to maintain said exhaust gas mixture at said preselected air/fuel ratio during said second portion of said period and to maintain said exhaust gas mixture at stoichiometry after termination of said period.

15. The method recited in claim 14 further comprising a step of generating said period in response to verification of said exhaust gas oxygen sensor readiness.

16. The method recited in claim 14 wherein said fuel command offset is removed upon termination of said first portion of said period.

17. The method recited in claim 14 wherein said feedback variable is biased by a lean bias during said second period portion and said lean bias is removed upon termination of said second period portion.

18. The method recited in claim 14 further comprising the steps of adaptively learning a second correction factor after termination of said period in response to said feedback variable and correcting said fuel charge with said second correction factor to maintain said exhaust gases at stoichiometry after said termination of said period.

19. The method recited in claim 18 wherein said step of adaptively learning said second correction value comprises steps of adaptively learning a plurality of second correction values for a corresponding plurality of engine speed/load ranges and storing each of said second correction values in a second correction table.

20. The method recited in claim 14 wherein said step of adaptively learning said correction value comprises steps of adaptively learning a plurality of correction values for a corresponding plurality of engine speed/load ranges and storing each of said correction values in a first correction table.

21. A control system for an internal combustion engine having its exhaust coupled to a catalytic converter, comprising:

an exhaust gas oxygen sensor coupled to the engine exhaust;

a controller generating a fuel command for delivering fuel to the engine based upon at least an amount of air inducted into the engine, said controller offsetting said fuel command by a predetermined amount in a lean direction during a period after engine start to shift engine exhaust gas mixture towards a preselected air/fuel ratio lean of stoichiometry by a preselected amount, said period comprising a first portion and a later occurring second portion, said controller adaptively learning said correction value during said second portion of said period from a feedback signal derived from said exhaust gas oxygen sensor and correcting said offset fuel command by said correction value so that said exhaust gas mixture is shifted more closely to said preselected air/fuel ratio; and feedback means for adjusting said fuel command in response to said feedback signal to maintain said exhaust gas mixture at said preselected air/fuel ratio during said second portion of said period and to maintain said exhaust gas mixture at stoichiometry after termination of said period.

* * * * *